United States Patent [19]

Ramsbro

[11] Patent Number: 4,855,558
[45] Date of Patent: Aug. 8, 1989

[54] CLAMPING DEVICE FOR A TOOL AT A MACHINE TOOL, PARTICULARLY AT A DIE SINKING ELECTRIC DISCHARGE MACHINE

[75] Inventor: Börje K. Ramsbro, Djursholm, Sweden

[73] Assignee: System 3R International ab, Sorterargatan, Sweden

[21] Appl. No.: 73,574

[22] Filed: Jul. 14, 1987

[30] Foreign Application Priority Data

Jul. 29, 1986 [DE] Fed. Rep. of Germany ....... 3625608
Nov. 21, 1986 [DE] Fed. Rep. of Germany ....... 3639801

[51] Int. Cl.$^4$ .............................................. B23H 7/26
[52] U.S. Cl. .................. 219/69.15; 279/1 L; 279/4
[58] Field of Search ............... 219/69 E; 279/1 L, 3, 279/4, 75, 89, 90, 123; 204/297 R; 408/197, 238, 239 R, 239 A; 409/287, 230, 218, 215; 82/326 B

[56] References Cited

U.S. PATENT DOCUMENTS

| | | | |
|---|---|---|---|
| 2,702,713 | 2/1955 | Brenner | 279/74 |
| 3,158,382 | 11/1964 | O'Neill | 279/123 |
| 3,727,929 | 4/1973 | Fink | 279/123 |
| 3,741,573 | 6/1973 | Treer | 279/75 |
| 4,020,313 | 4/1977 | Koga et al. | 219/69 E |
| 4,103,915 | 8/1978 | Zdanovsky et al. | 279/1 L |
| 4,114,910 | 9/1978 | Reeder | 279/1 L |
| 4,272,088 | 6/1981 | Perry | 279/123 |
| 4,290,617 | 9/1981 | Yoshida | 279/75 |
| 4,395,613 | 7/1983 | Barr et al. | 219/138 |
| 4,432,559 | 2/1984 | Rasmussen | 279/14 |
| 4,519,621 | 5/1985 | Okamoto | 279/4 |
| 4,676,516 | 6/1987 | Fink | 279/4 |
| 4,770,575 | 9/1988 | Kölblin et al. | 408/238 |

Primary Examiner—A. D. Pellinen
Assistant Examiner—Geoffrey S. Evans
Attorney, Agent, or Firm—Fleit, Jacobson, Cohn, Price, Holman & Stern

[57] ABSTRACT

A clamping device for a tool at a machine tool, particularly a die sinking electric discharge machine equipped with a chuck having two pairs of rails projecting from the underside of the chuck and arranged in a rectangular cross. The rails are provided with reference surfaces for adjusting the tool with respect to an x-direction and a y-direction relative to the machine tool, said directions extending transversely to a center line of the chuck. There are provided several posts projecting from the underside of the chuck, which are provided with reference surfaces at their free front surfaces which extend in the x-y-plane as defined by said directions. The rails are eccentric and offset angularly against each other and a tool holder is provided with a plane surface for abutting to the posts, into which two pairs of slots are cut which are in alignment with the rails and provided with elastic lips intended for abutment to the rails. The holder has a center bore with fixing elements for fixing and releasing a draw bar.

37 Claims, 5 Drawing Sheets

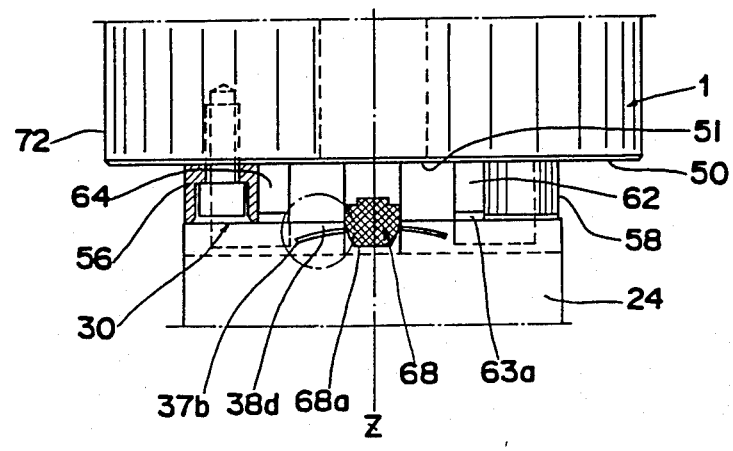
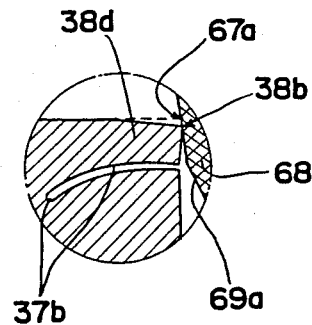
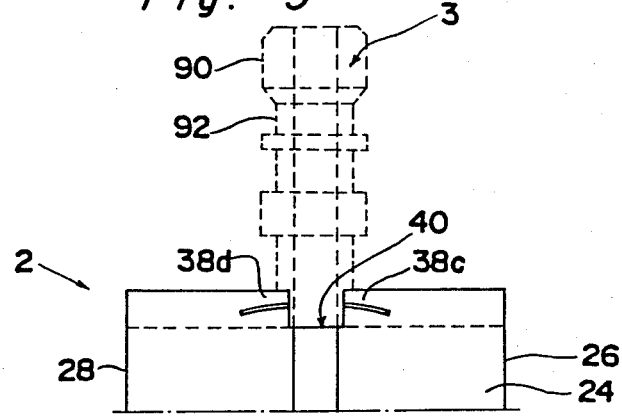

CLAMPING DEVICE FOR A TOOL AT A MACHINE TOOL, PARTICULARLY AT A DIE SINKING ELECTRIC DISCHARGE MACHINE

BACKGROUND OF THE INVENTION

The invention refers to a clamping device for a tool at a machine tool, particularly a die sinking electric discharge machine. Such machine is equipped with a chuck having two pairs of rails projecting from the underside of the chuck and arranged in a rectangular cross. The rails are provided with reference surfaces for adjusting the tool with respect to an x-direction and a y-direction relative to the machine tool, said directions extending transversely to a center line of the chuck.

A coupling device is known from No. 4,615,688 which may also be utilized at a die sinking electric discharge machine for working a workpiece by spark erosion by means of an electrode. In the known coupling device the electrode has to be coupled to the chuck of a quill of the die sinking electric discharge machine. In a die sinking electric discharge machine a fixed system of coordinates is defined, the x-y-plane of which extends transversely to the movement of the quill which may be moved up and down in z-direction. For positioning the electrode in the system of coordinates by the known coupling device posts having reference surfaces are set upon the tool which abut against a surface of the chuck for adjustment in z-direction when clamping the tool. Moreover, the underside of the chuck is provided with prismatic bars engaging in slots of a center plate for positioning the electrode within the x-y-plane. The center plate is arranged between the electrode and the chuck. A central pin of the chuck penetrates into a center hole and an eccentric pin into a slot of the center plate for centering and axially aligning said plate.

While the known coupling device shows means for aligning and centering a tool within the system of machine coordinates, it does not provide for means which allow clamping and unclamping of the tool to the chuck. Such clamping means, however, represent an important portion of the over-all coupling device because it has to support a great tool weight and to urge the tool into engagement with the aligning means. Otherwise, the desired repeatability of exact alignment is not maintained. On the other hand, the clamping means should allow for rapid and easy locking and unlocking to facilitate an exchange of electrodes.

OBJECT OF THE INVENTION

It is an object of the present invention to provide a clamping device such that the tool may be made outside the machine tool with a geometrical structure which is properly adjusted with reference to a machine-fixed system of reference surfaces.

A further object of the invention is to provide a clamping device which is particularly suitable for being utilized for clamping an electrode to a die sinking electric discharge machine in a properly adjusted manner with reference to a machine-fixed system of reference surfaces, whereby the adjustment is maintained even after a number of clamping and releasing operations have occurred.

It is another object of the present invention to design the mentioned clamping means in such a way that the tool can be positioned as often as desired and always with a high degree of accuracy in a given position at the chuck without intermediate use of a center plate. In particular, a reference system is to be provided permitting the exact manufacture of the electrode outside the machine tool without the need of adjusting the finished electrode in the machine tool.

A further object of the invention is to provide the clamping means with a coupling device permitting the fast coupling and releasing of the tool from the chuck.

The object of the invention is solved in that in the clamping device mentioned above there are several posts projecting from the underside of the chuck, which are provided with reference surfaces at their free front surfaces, which extend in the x-y-plane, with the rails being eccentric and offset angularly against each other and in that a tool holder is provided with a plane surface for abutting to the posts, into which two pairs of slots are cut which are in alignment with the rails and provided with elastic lips intended for abutment to the rails, the holder being equipped with a center bore with fixing elements for fixing and releasing a draw bar. Thus, according to the invention the counter references for the x-, y- and z-direction on the tool holder are arranged in a single plane, i.e. in its surface, permitting a simple and at the same time extremely exact machining of the holder.

The tool can be mounted to that side of the tool holder opposite to the surface and exactly machined to its intended shape outside of the machine tool. The invention furthermore suggests for this purpose that the side surfaces or edges of the tool holder be exactly aligned to the x- and y-direction. The properly shaped tool mounted to the tool holder is then clamped into the chuck by coupling the lower end of the draw bar to the tool holder and inserting the upper portion of the draw bar into the chuck. The surface of the tool holder then serves as counter reference for the posts and the slots serve as counter reference for the rails.

At the chuck two pairs of rails are preferrably provided such that the connecting line of one pair of rails crosses rectangularly the connecting line of the other pair of rails and the rails of one pair are opposite to each other relative to the center line of the chuck.

The tool holder is advantageously provided with at least two side surfaces, of which one is exactly parallel to a first pair of slots and the other to a second pair of slots. This facilitates the use of the tool holder for adjusting the tool within the system of coordinates outside of the machine tool.

In a preferred embodiment of the invention the fixing elements are formed as at least one tongue which extends radially into the center bore and under which a radially projecting nose located at the lower end of the draw bar may be held axially. Furthermore, the draw bar may be provided with an axially movable slide near its lower end. By simply inserting the lower end of the draw bar in the center bore and turning the draw bar until its nose grips under the tongue the draw bar can be coupled fast and reliably with the tool holder and fixed in its position by the slide which, for instance, may engage in a recess of the tool holder.

In a preferred embodiment of the invention the draw bar need only be turned by about 45° when there is provided one tongue between two adjacent slots respectively in circumferential direction of the center bore. In order to avoid any influence on the reference means at the tool holder caused by the fixing of the draw bar, it is advisable to lower the base of the center bore at least by the thickness of the noses over the base of the slots. It is moreover advisable to provide at the lower end of the draw bar four noses in equal circumferential distance so that the circumferential width of each nose may not exceed the circumferential space between two adjacent tongues, in particular the width of the slots.

The slide is advantageously shaped as ring embracing the draw bar, comprising at least one, advantageously four fingers arranged in equal circumferential distance to each other and extending axially towards the lower end of the draw bar, whereby their respective circumferential width corresponds to the distance between adjacent noses.

The handling of the slide ring is facilitated when the slide ring is held non-rotatably on the draw bar. For this purpose, it is preferable to provide four equally spaced guiding grooves at the circumference of the draw bar, which extend upwardly from its lower end and into each of which penetrates a rearward radial thickening of each finger. For the locking of the ring for fixing the coupling between draw bar and tool holder at least one of the guiding grooves is preferably shorter in axial direction than the other guiding grooves, whereby at least that finger, the thickening of which penetrates the shorter guiding groove, is radially elastic.

BRIEF DESCRIPTION OF THE DRAWINGS

The invention is of particular importance for manufacturing an electrode used in the spark-erosive machining of workpieces by means of a die sinking electric discharge machine. The invention is hence described in detail for this application by means of the embodiment shown in the enclosed drawings, of which show:

FIG. 3 a view of the electrode holder attached to the chuck by means of a draw bar, partly in section;

FIG. 4 a detail from FIG. 3 in enlarged scale;

FIG. 5 a view of the electrode holder with inserted draw bar;

DETAILED DESCRIPTION OF THE PREFERRED EMBODIMENT

Figure 1:
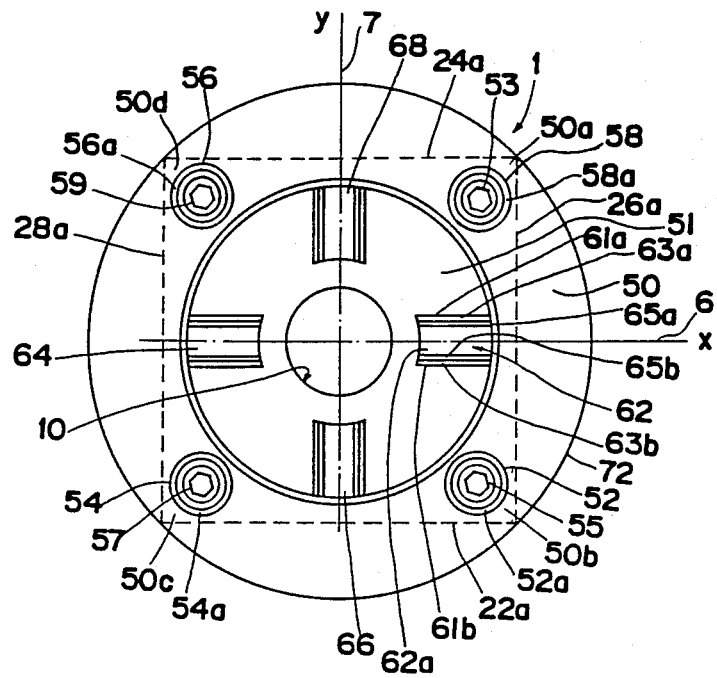
FIG. 1 a top view of the underside of a chuck of the machine.

The clamping device mainly comprises three components, namely a chuck designated with 1 with a centric draw bar mounting and reference elements at its underside, an electrode holder designated with 2 with plane surface and slots on its upper side, and a draw bar 3 which may be coupled to electrode holder 2.

When viewed from the top electrode holder 2 has a square form and comprises two pairs of parallel, opposite side surfaces 22, 24, 26, 28, of which side surfaces 22, 24 of the first pair exactly extend in x-direction and side surfaces 26, 28 of the second pair exactly extend in y-direction. The planely ground surface 30 lies parallel to the x-y-plane and thus rectangularly to side surfaces 22, 24, 26, 28. In the upper side of electrode holder 2 there are cut two pairs of slots 32, 34, 36, 38 of equal, respectively rectangular cross-section, of which each slot 32, 34 of the first pair is placed symmetrically to center plane 4 of electrode holder 2, which comprises the x-direction, and extends between a center bore 40 of electrode holder 2 and side surface 26 resp. 28. Each slot 36, 38 of the second pair is placed symmetrically to center plane 5 of electrode holder 2, which comprises the y-direction, and extends between center bore 40 and side surface 22 resp. 24. Slot 32 forms at its transition to surface 30 the edges 32a, 32b opposite relative to center plane 4, and slot 34 correspondingly forms opposite edges 34a, 34b. Likewise, slot 36 forms at its transition to surface 30 the edges 36a, 36b opposite relative to center plane 5, and slot 38 correspondingly forms opposite edges 38a, 38b. Slots 32, 34, 36, 38 subdivide surface 30 in four surface sections 30a to 30d. Surface section 30a is located in that corner section of the electrode holder surface created by side surfaces 22 and 26, surface section 30b is determined by side surfaces 26 and 24, surface section 30c by side surfaces 24 and 28 and surface section 30d by side surfaces 28, 22.

Figure 2:
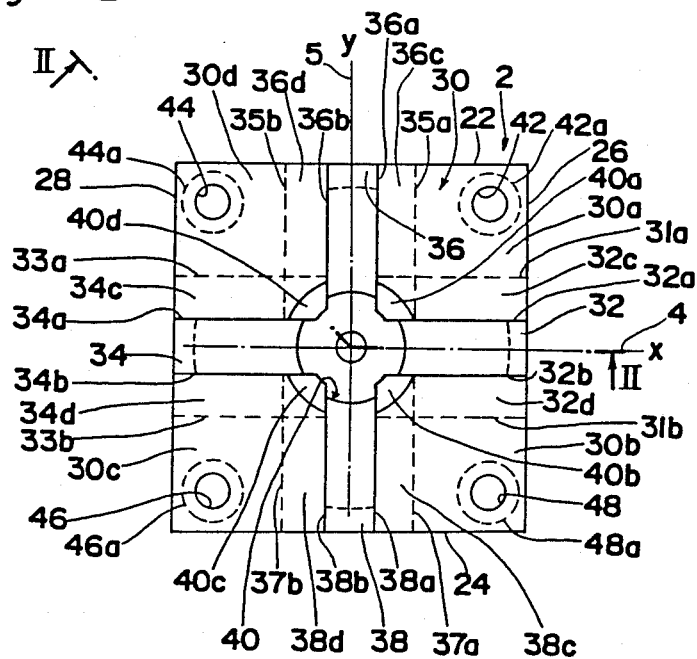
FIG. 2 a top view of the upper side of an electrode holder without draw bar.

In each flank of each slot a recess slightly bowed downwards is cut into the material of electrode holder 2 at about one third of the slot depth, which corresponds approximately to the width of the slot. Each recess has a length which may equal the length of the associated edge. Thus, the two opposite recesses 31a and 31b originate from slot 32, the two opposite recesses 35a, 35b from slot 36 and the two opposite recesses 37a, 37b from slot 38. In FIG. 2 the inner ends of the recesses are designated with the reference numerals mentioned above.

The recesses make it possible that the electrode holder material remaining between them and the adjacent surface section assumes the form of a lip which is elastic in z-direction and which is provided with the respective edge. The opposite lips bordering slot 32 on both sides are designated with 32c, 32d, the lips bordering slot 34 with 34c, 34d, the lips bordering slot 36 with 36c, 36d and the lips bordering slot 38 with 38c, 38d.

Figure 6:
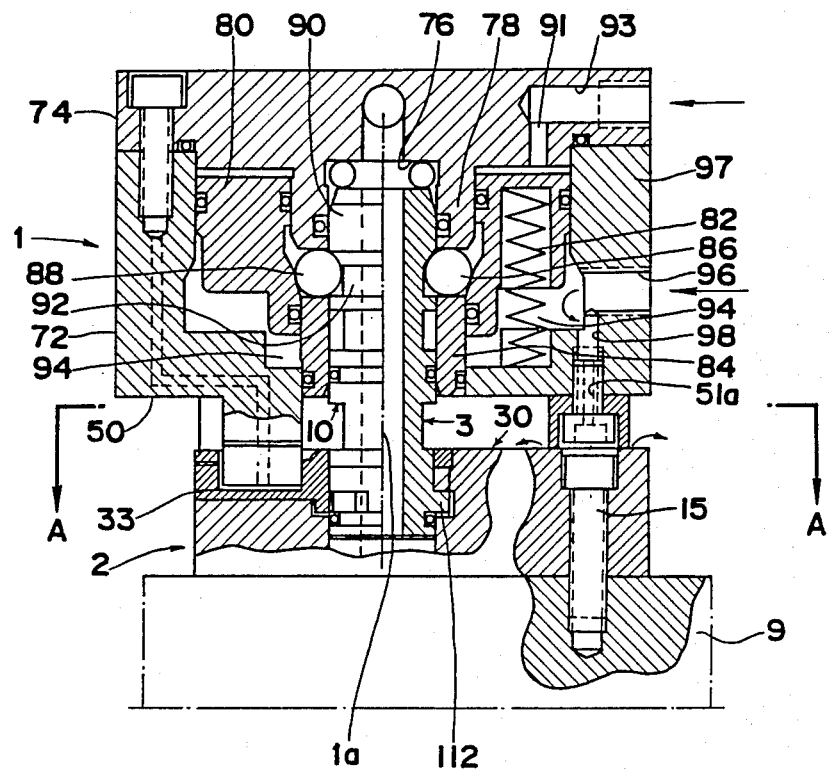
FIG. 6 a sectional view of the chuck with attached electrode holder.

FIG. 6 shows that an electrode 9 may be mounted to the underside of electrode holder 2. One possibility of mounting is to create in each of the four surface sections 30a to 30d respectively one through hole for a bolt, e.g. bolt 15, with the aid of which electrode 9 can be screwed to electrode holder 2. The exact position of each through bore 42, 44, 46, 48 is explained below. Each through bore 42, 44, 46, 48 is expanded at the upper side of electrode holder 2 in such a way that none of the bolt heads will protrude over surface 30 when electrode 9 is screwed to holder 2 by said bolts.

Chuck 1 connected with the die sinking electric discharge machine has an underside of cylindrical outer contour as shown in FIGS. 1 and 3. On the underside a ring surface 50 is planely ground such that it lies exactly parallel to the x-y-plane and thus transversely to center line 1a of chuck 1. Ring surface 50 encloses a circular surface 51, the surface quality of which need not meet any special requirements. Draw bar mounting 10 ends in the middle of circular surface 51. In regard of the outer diameter of ring surface 50 as well as the outer diameter of circular surface 51 the square surface 30 of electrode holder 2 is dimensioned in such a way in x- and y-direction that the geometrical projection of surface 30 to the underside of the chuck lies completely within ring surface 50 and covers completely circular surface 51, as shown by the dotted lines 22a, 24a, 26a, 28a in FIG. 1.

Between said lines 22a, 24a, 26a, 28a and the periphery of circular surface 51 there remain ring surface sections 50a, 50b, 50c, 50d in the four fields produced by center plane 6 containing the x-direction and center plane 7 containing the y-direction of ring surface 50. One of the four posts 52, 54, 56, 58, each of cylindrical cross-sections, juts out of one of the four ring surface sections, respectively. The posts and chuck part 72 having ring surface 50 may be made of one part. Optionally, posts 52, 54, 56, 58 are centrically bored for respectively receiving a screw 53, 55, 57, 59 in such a way that the screws do not protrude over a ring-shaped reference surface 52a, 54a, 56a, 58a on the free front face of each post. The reference surfaces are made very narrow by appropriate slopes towards the through holes and the outer periphery of the respective post. Moreover, reference surfaces 52a, 54a, 56a and 58a are planely ground, are of equal distance to ring surface 50 and lie exactly parallel to the x-y-plane. Thus, reference surfaces 52a, 54a, 56a and 58a, individually and altogether, constitute a reference in z-direction for exactly positioning electrode 9 via electrode holder 2 when surface 30 of the latter abuts against said reference surfaces 52a, 54a, 56a, 58a.

Two pairs of rails 62, 64, 66 and 68 of equal, substantially rectangular cross-section project from circular surface 51 between draw bar mounting 10 and the periphery of circular surface 51, of which each rail 62, 64 of the first pair is placed symmetrically to center plane 6 and each rail 66, 68 of the second pair symmetrically to center plane 7. The rails are worked out of the material of chuck part 72. The outer contours of the rails are all of the same type, hence only that of rail 62 is described in detail.

Rail 62 has three pairs of plane side surfaces extending transversely to the periphery of the circular surface and symmetrically to center plane 6: the side surfaces 61a, 61b bordering circular surface 51 are substantially transverse to circular surface 51. Side surfaces 63a, 63b adjoining side surfaces 61a, 61b are only slightly inclined towards center plane 6, while side surfaces 65a, 65b extending between front surface 62a of rail 62 and side surfaces 63a, 63b include a greater angle with center plane 6, of for instance approximately 45°. Side surfaces 63a, 63b serve as reference surfaces for exactly positioning electrode holder 2 in the x-y-plane. For this purpose, the transition from side surfaces 61a, 61b to side surfaces 63a, 63b has a distance to ring surface 50, which is smaller than the distance of reference surfaces 52a, 54a, 56a, 58a to ring surface 50. On the other hand, the transition from the slightly inclined side surfaces 63a, 63b to the more inclined side surfaces 65a, 65b has a distance to ring surface 50, which is greater than the distance of each of the reference surfaces 52a, 54a, 56a, 58a to ring surface 50. Front surface 62a has, of course, such a height above ring surface 50 that when electrode holder 2 is clamped to chuck 1 the base of slot 32 is not touched by rail 62.

When electrode holder 2 is drawn towards chuck 1 by means of draw bar 3 the reference surfaces 52a, 54a, 56a, 58a lie on ring-shaped supporting surfaces 42a, 44a, 46a, 48a of surface sections 30a, 30b, 30c, 30d so that electrode holder 2 is clearly positioned in z-direction. At the same time rails 62, 64, 66, 68 penetrate in slots 32, 34, 36, 38 with the more inclined side surface 65a, 65b, while the less inclined reference surfaces 63a, 63b come into contact with edges 32a, 32b and, cause by the clamping process, bend lips 32c, 32d axially inwards until the above mentioned position of the electrode holder in z-direction is reached (FIG. 4). Due to this penetration of the rails into the slots the exact positioning of electrode holder 2 in z-direction ensures simultaneously its exact positioning in x-direction and y-direction. The dynamic fixing of electrode holder 2 in x- and y-direction (caused by the elasticity of lips 32c, 32d; 34c, 34d; 36c, 36d; 38c, 38d) excludes any clearance. When creating the references at electrode holder 2 is it advantageous that they are all in a common plane, i.e. that edges 32a, 32b; 34a, 34b; 36a, 36b; 38a, 38b are produced with the creation of surface 30 without the need of changing the setting of the machine producing the electrode holder.

Edges 32a, 32b, 34a, 34b, 36a, 36b, 38a, 38b as well as those parts of the rails having reference surfaces and the posts with reference surfaces may be specially hardened; from FIG. 3 it can be seen that for this purpose rail 68 is equipped with a top 68a of hard metal or tungsten carbide, at which reference surfaces 67a, 69b are machined.

This fixing of the position of electrode holder 2 affords the advantage that electrode holder 2 is provided with a plane surface 30 which just as the planes and side edges 22, 24, 26, 28 exactly aligned in x-direction resp. y-direction may be used as reference surfaces for adjusting electrode 9 during its manufacturing outside the die sinking electric discharge machine.

Each through bore 42, 44, 46, 48 is arranged in an area of the associated surface section 30a, 30b, 30c, 30d, which lies completely within the supporting surfaces 42a, 44a, 46a, 48a. Thus, the exact fixing of electrode holder 2 in z-direction is directly transmitted to a corresponding positioning of electrode 9.

Figure 7:
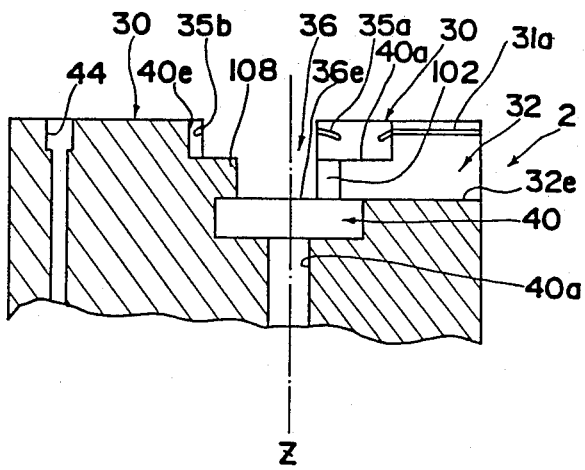
FIG. 7 a section through the electrode holder along line II—II from FIG. 2.

In the shown embodiment of the invention each of the slots 32, 34, 36, 38 ends in center bore 40 of the electrode holder 2. Wall sections 40a, 40b, 40c, 40d of center bore 40 remaining between respectively two adjacent slots project over a part of their axial thickness into center bore 40 (FIGS. 2 and 7) thus forming tongues 102, 104, 106, 108 which are used as fixing elements for mounting draw bar 3 to electrode holder 2.

According to FIG. 6 chuck 1 is provided with a cupular chuck part 72, at the underside of which ring surface 50 is machined. Chuck part 72 is attached to a plate 74 at the machine by means of bolts. Plate 74 has a central blind hole 76 which is aligned to draw bar mounting 10 and surrounded by a ring-shaped wall 78. Between wall 78 and the inner side of chuck part 72 there is a ring space in which a mounting ring 80 is axially movable. A spring 82 supported by the inner base of chuck part 72 urges the mounting ring 80 in an upper locking position. This position of mounting ring 80 is shown in FIG. 6. When moved axially mounting ring 80 is guided along the outer surface of cheek 78 and an opposite inner surface of chuck part 72. Mounting ring 80 is furthermore guided at the outer surface of a guiding ring 84, which exactly fixes draw bar mounting 10 in the center bore of chuck part 72 and extends towards wall 78. Between wall 78 and guiding ring 84 there are circumferentially equally distributed balls 86, 88 placed around the periphery of draw bar mounting 10 which due to a depression having conical surfaces in mounting ring 80 can escape radially outwards when mounting ring 80 is moved downwards thus clearing the path for head 90 of draw bar 3. Below head 90 draw bar 3 has a portion 92 of reduced diameter, into which balls 86, 88 are pressed by mounting ring 80 when moved upwards thus axially holding draw bar 3.

According to the invention there is a ring-shaped pressure chamber 94 below mounting ring 80, which may be connected to a source of compressed air via a channel 96 penetrating casing 97 of chuck part 72. Pressure chamber 94 is furthermore connected to four channels 98 penetrating the base of chuck part 74, which communicate with pressure channels 51a of screws 53, 55, 57, 59. When channel 96 is connected to a soure of compressed air, mounting ring 80 is pressed in addition to the force of spring 82 in locking position. At the same time compressed air escapes from pressure channels 51a and cleans supporting surfaces 42a, 44a, 46a, 48a from any particles which possibly might adhere thereon when electrode holder 2 is attached. When electrode holder 2 is fixedly clamped to chuck 1 compressed air can no longer escape through the pressure channels 51a and the locking pressure for mounting ring 80 is increased. As a result, the clamping force of the chuck for the electrode holder with electrode and draw bar is approximately triplicated.

With this device it is no longer necessary to design spring 82 for solely supplying the contact pressure required for pressing electrode holder 2 with electrode 9 against the reference surfaces. When designing spring 82 safety aspects need only be considered ensuring that upon failure of the compressed air source electrode holder 2 including draw bar 3 does not unintentionally drop out of chuck 1.

For removing electrode holder 2 with draw bar 3 the upper side of mounting ring 80 is connected via channels 91, 93 to a compressed air source, the pressure of which surmounts the force of spring 82 (when turning off the locking air pressure) and moves mounting ring 80 in its lower open position. Balls 86, 88 then escape outwards into the depression of mounting ring 80 thus clearing the path for head 90 of draw bar 3.

Figure 8:
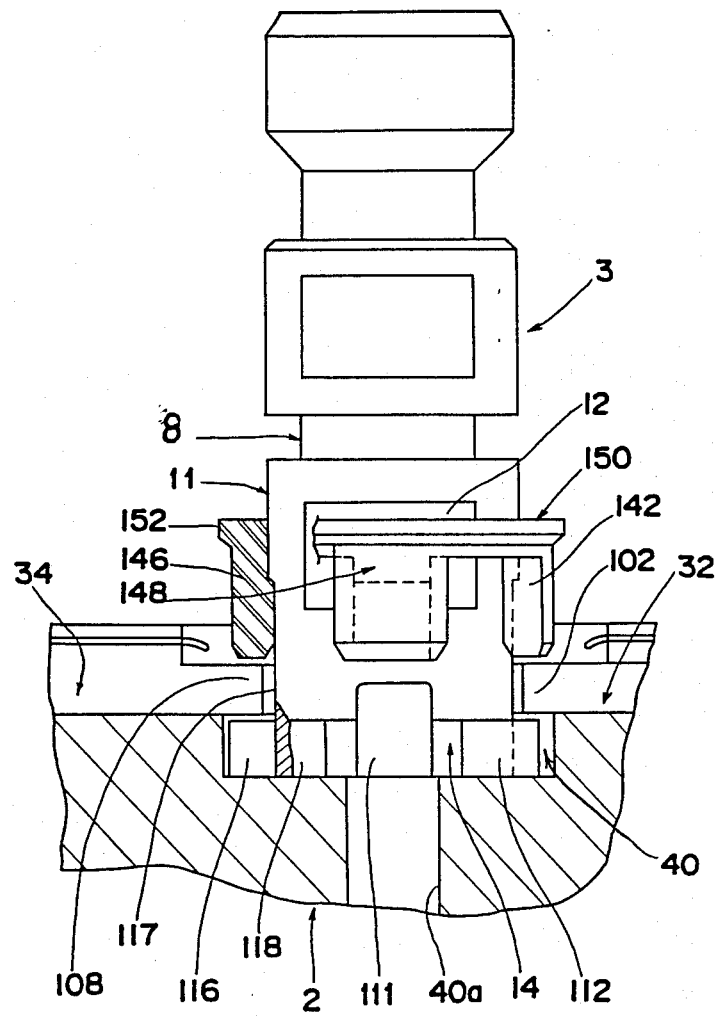
FIG. 8 the view of a draw bar with fixing ring, partly in section, as well as the electrode holder cut in x-direction.
Figure 9:
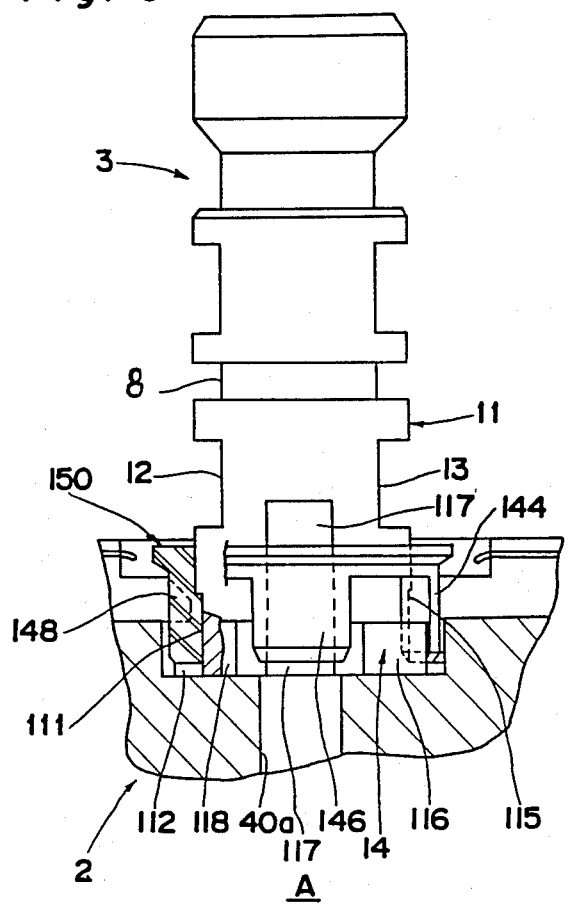
FIG. 9 the view of the draw bar of FIG. 8 after being rotated by 90° with locked fixing ring and the electrode holder cut in y-direction.
Figure 10:
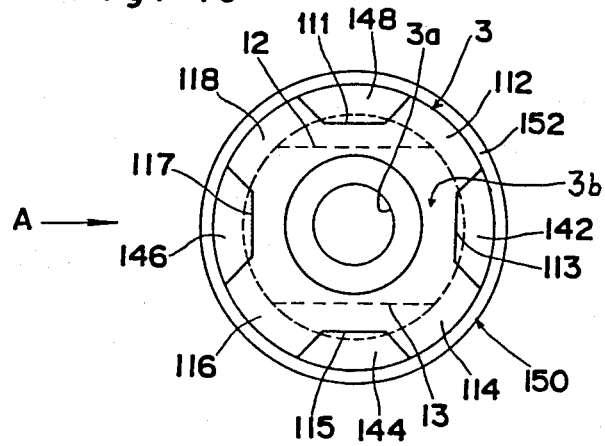
FIG. 10 a view of the draw bar with fixing ring from below.

From draw bar 3 which, except of some radial recesses, has an essentially cylindrical form only its lower section below ring slot 8 for receiving a sealing washer, not shown, is here described (FIGS. 8-10). The cylindrical lower section 11 has on two opposite circumferential sections respectively flattened portions 12, 13, at which draw bar 3 may be gripped by e.g. the fork of a gripper and transported by it. Below flattened portions 12, 13 draw bar 3 has a length which is a little bit greater than the depth of center bore 40. At the lower end 14 of draw bar 3 four circumferentially equally spaced noses 112, 114, 116, 118 protrude radially outwards, which in circumferential direction have a length which is not greater than the width of one of slots 32, 34, 36, 38. In radial direction noses 112, 114, 116, 118 do not protrude more than the inside diameter of center bore 40 in its lowest section. Beginning from the lower front surface 36 of draw bar 3 there are guiding grooves 111, 113, 115, 117 between respectively two adjacent noses 112, 114, 116, 118 in the form of flattenings of the cylindrical outer contour of section 11. The two opposite guiding grooves 111, 115 extending parallel to the flattenings 12 and 13 end in axial direction in spaced relationship before the associated flattened portion 12, 13, as can be seen at the example of guiding groove 111 in FIG. 8. The two other opposite guiding grooves 113, 117 extend at section 11 in axial direction away from front surface 36 ending in the height of said flattened portions 12, 13, as can be seen at the guiding groove 117 in FIGS. 8 and 9.

The lower section 11 of draw bar 3 is surrounded by a slide designated with 150, which in the example shown has the form of a fixing ring provided with fingers of, for instance, plastic material. Ring 150 can be moved in axial direction on lower section 11 and is provided above the fingers with a circumferential radially protruding handling rib 152. Four in circumferential direction equally spaced fingers 142, 144, 146, 148 extend downwards from rib 152, which contact with their inner surfaces the lower section 11. In circumferential direction fingers 142, 144, 146, 148 have respectively a width which fills completely the intermediate space between respectively two adjacent noses 112, 114, 116, 118. Rearwardly each finger 142, 144, 146, 148 is provided with a thickening which may extend into respectively one of the guiding grooves 111, 113, 115, 117. Thus, the thickenings of opposite fingers 142, 146 are permanently engaged in the associated long guiding grooves 113, 117, while the thickenings of the opposite radially elastic fingers 144, 148 engage only the shorter guiding grooves 115, 111 when in locking position as shown in FIG. 9 and slip upwardly out of guiding grooves 115, 111 when in unlocked lifted position as shown in FIG. 8. The greatest width of each of fingers 142, 144, 146, 148 is in any way smaller that the width of one of slots 32, 34, 36, 38. Due to the engagement of the rearward thickenings of fingers 142, 146 in guiding grooves 113, 117 ring 150 is held in unrotatable but axially movable position on the lower section 11 of draw bar 3.

For coupling draw bar 3 provided with ring 150 with electrode holder 2 the lower section 11 is inserted into center bore 40 in such a way that each of noses 112, 114, 116, 118 may penetrate in the intermediate space provided by slots 32, 34, 36, 38 between tongues 102, 104, 106, 108 until to the base of center bore 40. Unless ring 150 is not already in its lifted position, it is moved axially on draw bar 3 in the lifted position shown in FIG. 3 by abutment of the underside of fingers 142, 144, 146, 148 against tongues 102, 104, 106, 108 when moving draw bar 3 further into the center bore. Draw bar 3 is then rotated in center bore 40 by an angle of approx. 45°, at least by such an angle that fingers 142, 144, 146, 148 may penetrate into the intermediates spaces created by slots 32, 34, 36, 38 between the tongues. Ring 150 is then manually pushed downwards along lower section 11 in its locking position shown in FIG. 9, so that the fingers are located between the tongues preventing a further rotating of draw bar 3.

In this position of draw bar 3 respectively one of fingers 142, 144, 146, 148 grips under respectively one of tongues 102, 104, 106, 108. Draw bar 3 is thus coupled with electrode holder 2 and can then be inserted into the chuck mounting of a die sinking electric discharge machine, as explained above.

For releasing the draw bar ring 150 is moved by hand axially upwards along lower section 11 by using handling rib 152, which is easily accessible above the slots and the upper radially expanded sections of the center bore. Due to their radial elasticity fingers 144, 148 easily escape from guiding grooves 111, 115. Draw bar 3 can then be rotated to such a degree that its noses are released from the engagement with the tongues, i.e. draw bar 3 can then be lifted off upwards without interference by electrode holder 2.

The above described fixing mechanism for coupling draw bar 3 with electrode holder 2 is not limited to the special design of ring 150. Instead of the ring a simple axially movable slide attached to lower section 11 may be used, which engages in form-fit manner either in one of the slots or also in a radial recess at one of the tongues in circumferential direction.

According to the invention it is furthermore possible to elastically urge downwards ring 150 in the direction of the fixing position shown in FIG. 9 by means of one or several spring elements. When lower section 11 is inserted in center bore 40, ring 150 then escapes upwards in lifted position and, after properly rotating draw bar 3, moves automatically in lowered fixing position due to the spring force. Moreover, it is possible to design the combined effect of noses and tongues in such a way that draw bar 3 is detachably anchored at electrode holder 2 in the manner of a quarter-turn fastener.

What is claimed is:

1. A clamping device for a tool at a machine tool, the device comprising:
a plurality of posts projecting from the underside of a chuck having two pairs of rails projecting from the underside of the chuck, said posts being provided with reference surfaces at their free front surfaces extending in an x-y-plane defined by said directions, the rails being offset angularly against each other; and a tool holder provided with a plane surface for abutting to the posts, into which two pairs of slots are cut which are in alignment with the rails and provided with elastic lips intended for abutment to the rails, the holder having a center bore with fixing elements for fixing and releasing a draw bar.

2. A clamping device according to claim 1 wherein the tool holder is provided with at least two side surfaces, of which one is exactly parallel to a first pair of slots and the other exactly parallel to the second pair of slots.

3. A clamping device according to claim 1 wherein the posts are mounted in equally spaced relationship to a ring surface at the underside of the chuck.

4. A clamping device according to claim 2 wherein the posts are mounted in equally spaced relationship to a ring surface at the underside of the chuck.

5. A clamping device according to claim 1 wherein each reference surface is a narrow, ring-shaped surface.

6. A clamping device according to claim 3 wherein each reference surface is a narrow, ring-shaped surface.

7. A clamping device according to claim 1 wherein each post includes an axial air pressure channel communicating to a source of compressed air connected to the chuck.

8. A clamping device according claim 1 wherein the chuck has a mounting device for a draw bar, which is equipped with a pressure chamber for clamping the draw bar, said pressure chamber being connected to a source of compressed air.

9. A clamping device according claim 7 wherein the chuck has a mounting device for a draw bar, which is equipped with a pressure chamber for clamping the draw bar, said pressure chamber being connected to a source of compressed air.

10. A clamping device according to claim 9 wherein the pressure channels are connected with the pressure chamber.

11. A clamping device according to claim 1 wherein the slots have edges which are used together with the abutting surfaces inclined to the center line of the tool holder for aligning the tool holder in x-direction and y-direction.

12. A clamping device according to claim 1 wherein each slot has two opposite, axially elastic lips.

13. A clamping device according to claim 2 wherein each slot has two opposite, axially elastic lips.

14. A clamping device according to claim 11 wherein each slot has two opposite, axially elastic lips including said edges.

15. A clamping device according to claim 1 wherein the reference surfaces have a distance in z-direction from the ring surface, such that the reference surfaces lie within the axial width of the abutting surfaces.

16. A clamping device according to claim 1 wherein the posts are arranged radially outside of the rails.

17. A clamping device according to claim 3 wherein the posts are arranged radially outside of the rails.

18. A clamping device according to claim 7 wherein the posts are arranged radially outside of the rails.

19. A clamping device according claim 1 wherein the draw bar is held in the center bore by means of a quarter-turn fastener.

20. A clamping device according to claim 1 wherein the tool holder is provided with bores for mounting the tool, which are arranged within supporting areas of the tool holder plane surface, which cooperate with the reference surfaces when clamping the tool holder to the chuck by means of the draw bar.

21. A clamping device according to claim 1 wherein each rail is provided with a top of hard metal or tungsten carbide, at which the reference surfaces are machined.

22. A clamping device according to claim 1 wherein the fixing elements comprise at least one tongue projecting into the center bore, and at least one radially projecting nose located at the lower end of the draw bar.

23. A clamping device according to claim 22 wherein an axially movable slide is held on the draw bar near the lower end thereof.

24. A clamping device according to claim 22 wherein one tongue is provided between respectively two adjacent slots.

25. A clamping device according to claim 22 wherein the center bore is cut deeper into the holder than the slots.

26. A clamping device according to claim 22 wherein the lower end of the draw bar is provided with four radially projecting noses arranged in equal circumferential distance, the circumferential width of each nose not exceeding the circumferential space between two adjacent tongues.

27. A clamping device according to claim 3 wherein the tool holder has a recess permitting the locking-in of the slide.

28. A clamping device according to claim 7 wherein the recess constitutes one of the slots and wherein the slide has a circumferential width corresponding to the inside diameter of one of the slots.

29. A clamping device according to claim 3 wherein the slide is shaped as a ring embracing the draw bar and comprising at least one finger extending axially towards the lower end of the draw bar.

30. A clamping device according to claim 29 wherein the ring comprises four fingers arranged in equal circumferential distance with circumferential widths which correspond to the inside diameter of one of the slots.

31. A clamping device according to claim 23 wherein the slide is held unrotatably on the draw bar.

32. A clamping device according to claim 29 wherein the ring is held unrotatably on the draw bar.

33. A clamping device according to claim 29 wherein four equally spaced guiding grooves are provided at the circumference of the draw bar whereby at least one of the fingers penetrates into one of the guiding grooves by a radial rearward thickening.

34. A clamping device according to claim 33 wherein at least one of the guiding grooves is shorter in axial direction than the other guiding grooves and wherein at least that finger penetrating into the shorter guiding groove is radially elastic.

35. A clamping device according to claim 29 wherein the ring is elastically urged to its lower locking position by means of a spring element.

36. A clamping device according to claim 34 wherein the ring is elastically urged to its lower locking position by means of a spring element.

37. A clamping device for a tool at a machine tool, comprising:

a plurality of posts projecting from the underside of a chuck having two pairs of rails projecting from the underside of the chuck and arranged in a rectangular cross with the rails being provided with abutting surfaces for aligning the tool with respect to an x-direction and a y-direction relative to the machine tool, said directions extending transversely to a center line of the chuck, said posts being provided with reference surfaces at their free front surfaces extending in an x-y-plane defined by said directions, the rails being offset angularly against each other; and a tool holder provided with a plane surface for abutting to the posts, into which two pairs of slots are cut which are in alignment with the rails and provided with elastic lips intended for abutment to the rails, the holder having a center bore with fixing elements for fixing and releasing a draw bar.

* * * * *